United States Patent [19]

Hara et al.

[11] Patent Number: 5,723,779

[45] Date of Patent: Mar. 3, 1998

[54] SYSTEM FOR DETERMINING RESIDUAL LIFE OF FRICTION CLUTCH

[75] Inventors: Tomoyuki Hara, Isehara; Toshiharu Takasaki, Sagamihara, both of Japan

[73] Assignee: Nissan Motor Co., Ltd., Yokohama, Japan

[21] Appl. No.: 611,741

[22] Filed: Mar. 6, 1996

[30] Foreign Application Priority Data

Mar. 9, 1995 [JP] Japan .................. 7-049867

[51] Int. Cl.$^6$ .................................................. F16D 66/00
[52] U.S. Cl. .................. 73/118.1; 73/121; 340/454
[58] Field of Search ................... 340/453, 454; 73/115, 116, 117.2, 117.3, 118.1, 121, 123, 126, 129

[56] References Cited

U.S. PATENT DOCUMENTS

| | | |
|---|---|---|
| 4,241,603 | 12/1980 | Han et al. .................. 73/129 |
| 4,488,140 | 12/1984 | Lang et al. ................ 340/453 |
| 4,499,450 | 2/1985 | Makita ..................... 340/453 |
| 4,550,815 | 11/1985 | Gale ....................... 340/454 |
| 4,651,142 | 3/1987 | Klatt ...................... 340/453 |
| 5,058,718 | 10/1991 | Tojima et al. .............. 340/454 |
| 5,522,259 | 6/1996 | Schmidt et al. ............. 73/121 |
| 5,559,286 | 9/1996 | White et al. ............... 340/454 |

FOREIGN PATENT DOCUMENTS 62-175223  7/1987  Japan .

*Primary Examiner*—George M. Dombroske
*Attorney, Agent, or Firm*—Foley & Lardner

[57] ABSTRACT

A system for determining a residual life of a friction clutch is constructed so that the loaded condition of the clutch is determined in accordance with detected differential revolution, control oil pressure, oil temperature, and loading time, with which the residual life of the friction clutch is calculated.

8 Claims, 3 Drawing Sheets

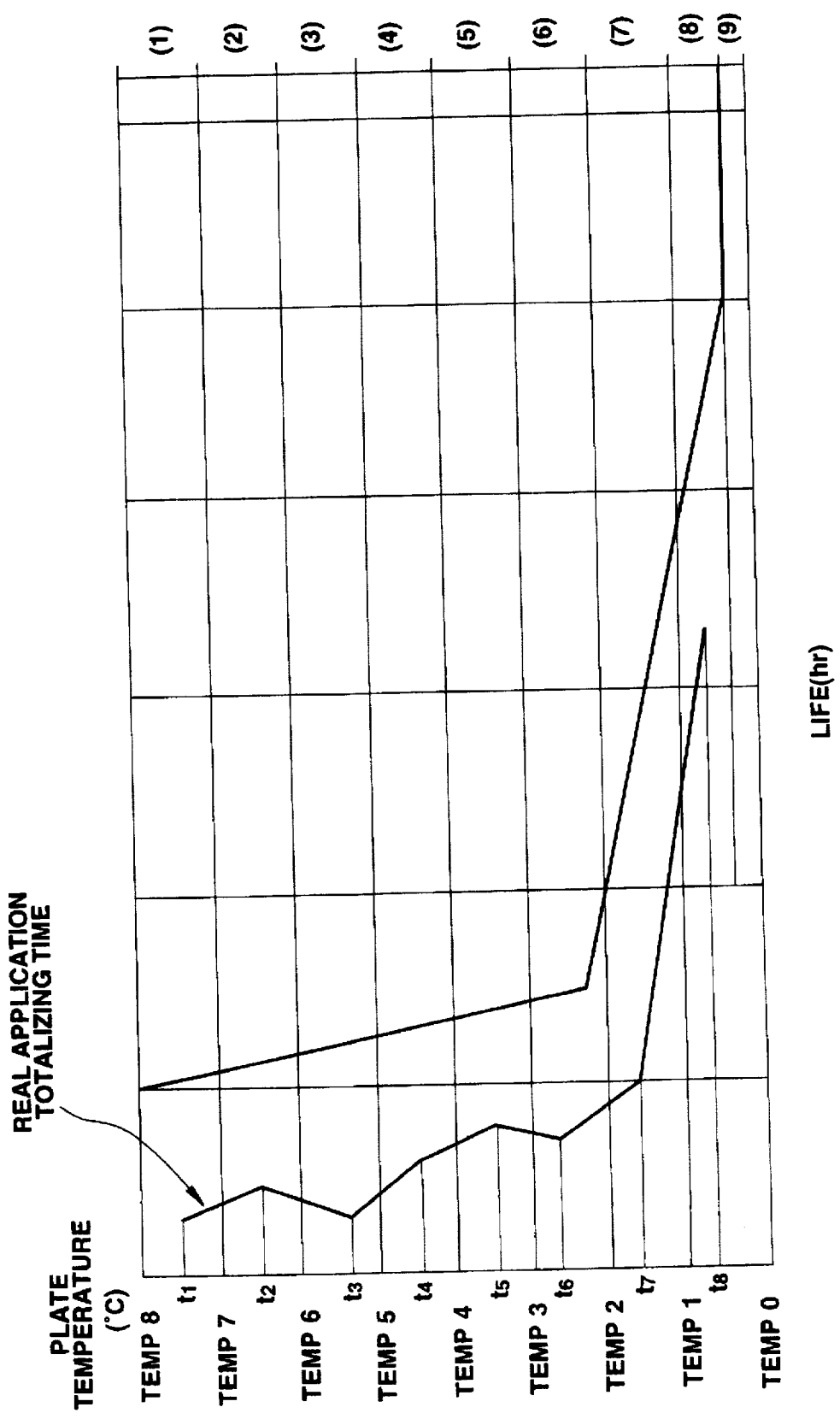

SYSTEM FOR DETERMINING RESIDUAL LIFE OF FRICTION CLUTCH

BACKGROUND OF THE INVENTION

The present invention relates generally to a multiple friction clutch serving, e.g., as a torque distribution clutch in a traction distribution controller for four-wheel drive motor vehicles. More particularly, the present invention relates to a system for determining a residual life of the multiple friction clutch.

Conventionally, there are known many traction distribution controllers for four-wheel drive motor vehicles wherein engine traction is transmitted to front or subdriving wheels through a torque distribution clutch having an engaging force varied in response to a control signal and with respect to rear or main driving wheels in an engine direct-coupled drive system, e.g., a wet multiple friction clutch comprising drive plates and driven plates placed alternately. One of such known traction distribution controllers is constructed such that a revolution difference is calculated between the front and rear wheels, and that as the revolution difference is greater, i.e., as slippage of the rear or main driving wheels is greater, the engaging force of the torque distribution clutch is enlarged to increase a distribution of traction to the front or subdriving wheels, thereby obtaining a quick restraint of slippage of the rear or main driving wheels.

This traction distribution controller is provided with a transfer system comprising the multiple friction clutch, a control oil pressure generator for generating control oil pressure which produces clutch engaging force, and a torque split controller for outputting, to a solenoid valve arranged in the control oil generator, a predetermined solenoid drive current in accordance with information from various input sensors.

However, the known traction distribution controller for four-wheel drive motor vehicles is not capable of knowing when a load is applied to the multiple friction clutch. Thus, for determining a life of the multiple friction clutch, to be exact, a life of a facing thereof, a transfer unit must be removed from the motor vehicle, and disassembled completely to inspect visually the condition of the facing of the multiple friction clutch arranged therein, requiring a large amount of work.

Moreover, due to impracticability of a frequent execution of the above visual inspection, it is not possible to always determine a remaining useful life of the multiple friction clutch, and/or to detect beforehand occurrence of a failure of the multiple friction clutch. This results in the fact that a replacement or repair of the multiple friction clutch may not happen after occurrence of a failure thereof, causing an inconvenience in view of user service.

It is, therefore, an object of the present invention to provide a system for determining a residual life of a multiple friction clutch, which enables determination of a life of the multiple friction clutch and/or beforehand detection of occurrence of a failure of the multiple friction clutch.

SUMMARY OF THE INVENTION

According to one aspect of the present invention, there is provided a system for determining a residual life of a multiple friction clutch, comprising:

means for detecting a differential revolution of the multiple friction clutch and generating a differential revolution signal indicative of said differential revolution detected;

means for detecting a pressure of working fluid which serves as a control torque of the multiple friction clutch and generating a pressure signal indicative of said pressure detected;

means for detecting a temperature of working fluid and generating a temperature signal indicative of said temperature detected;

means for measuring a loading time of the multiple friction clutch and generating a loading time signal indicative of said loading time measured;

means for determining a loaded condition of the multiple friction clutch in response to said differential revolution signal, said pressure signal, said temperature signal, and said loading time signal and generating a loaded condition signal indicative of said loaded condition determined;

means for calculating a residual life of the multiple friction clutch in response to said loaded condition signal and generating a residual life signal indicative of said residual life calculated; and means for displaying said residual life signal.

Another aspect of the present invention lies in providing a system for determining a residual life of a multiple friction clutch, comprising:

a first sensor arranged to detect a differential revolution of the multiple friction clutch;

a second sensor arranged to detect a pressure of working fluid which serves as a control torque of the multiple friction clutch;

a third sensor arranged to detect a temperature of working fluid;

a control unit connected to said first, second and third sensors, said control unit comprising:

means for measuring a loading time of the multiple friction clutch and generating a loading time signal indicative of said loading time measured;

means for determining a loaded condition of the multiple friction clutch in response to signals derived from said first sensor, said second sensor and said third sensor, and said loading time signal and generating a loaded condition signal indicative of said loaded condition determined; and means for calculating a residual life of the multiple friction clutch in response to said loaded condition signal and generating a residual life signal indicative of said residual life calculated; and a display connected to said control unit, said display serving to display said residual life signal.

BRIEF DESCRIPTION OF THE DRAWINGS

FIG. 3 is a bearing force or life chart of a facing of the multiple friction clutch.

DETAILED DESCRIPTION OF THE INVENTION

Figure 1:
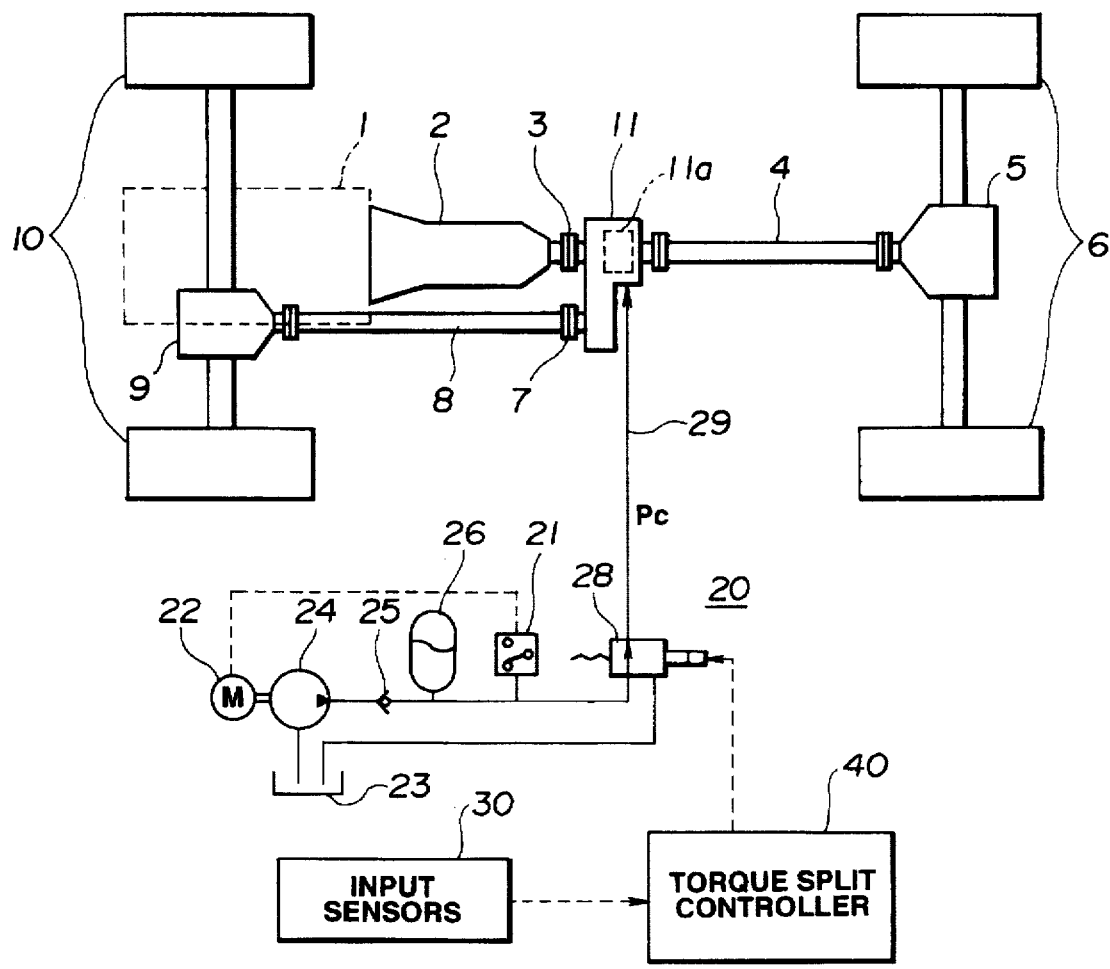
FIG. 1 is a diagrammatic view showing a drive system of a four-wheel drive motor vehicle to which the present invention is applied.

Referring first to FIG. 1, there is shown a four-wheel drive motor vehicle which cruises basically in the rear-wheel drive mode. The motor vehicle is provided with a drive system comprising an engine 1, a transmission 2, a transfer input shaft 3, a rear propeller shaft 4, a rear differential gear 5, rear or main driving wheels 6, a transfer output shaft 7, a front propeller shaft 8, a front differential gear 9, and front or subdriving wheels 10. Engine traction is directly transmitted to the rear wheels 6 via the transmission 2, while it is transmitted to the front wheels 10 through a transfer 11 interposed between the transfer input and output shafts 3, 7 in a front wheel drive system.

A traction distribution controller for controlling appropriately a distribution of traction between the front and rear wheels is provided with the transfer 11 comprising a wet multiple friction clutch 11a as a torque distribution clutch, a control oil pressure generator 20 for generating control oil pressure that produces clutch engaging force, and a torque split controller 40 for outputting, to a solenoid valve 28 arranged in the control oil generator 20, a predetermined solenoid drive current in accordance with information from various input sensors 30.

The control oil pressure generator 20 is provided with a motor 22 driven and stopped by a relief switch 21, a hydraulic pump 24 actuated by the motor 22 for sucking working fluid from a reservoir tank 24, an accumulator 26 for accumulating a pump discharge pressure or primary pressure out of the hydraulic pump 24 through a check valve 25, and the solenoid valve 28 for adjusting a line pressure or secondary pressure out of the accumulator 26 to a predetermined control oil pressure Pc in accordance with a solenoid drive current derived from the torque split controller 40, working fluid for the control oil pressure Pc being supplied to a clutch port via a control oil pressure passage 29. A torque or engaging force of the multiple friction clutch 11a is controlled in accordance with the control oil pressure Pc supplied to the clutch port, with which a distribution of traction to the front or subdriving wheels 10 is controlled.

Figure 2:
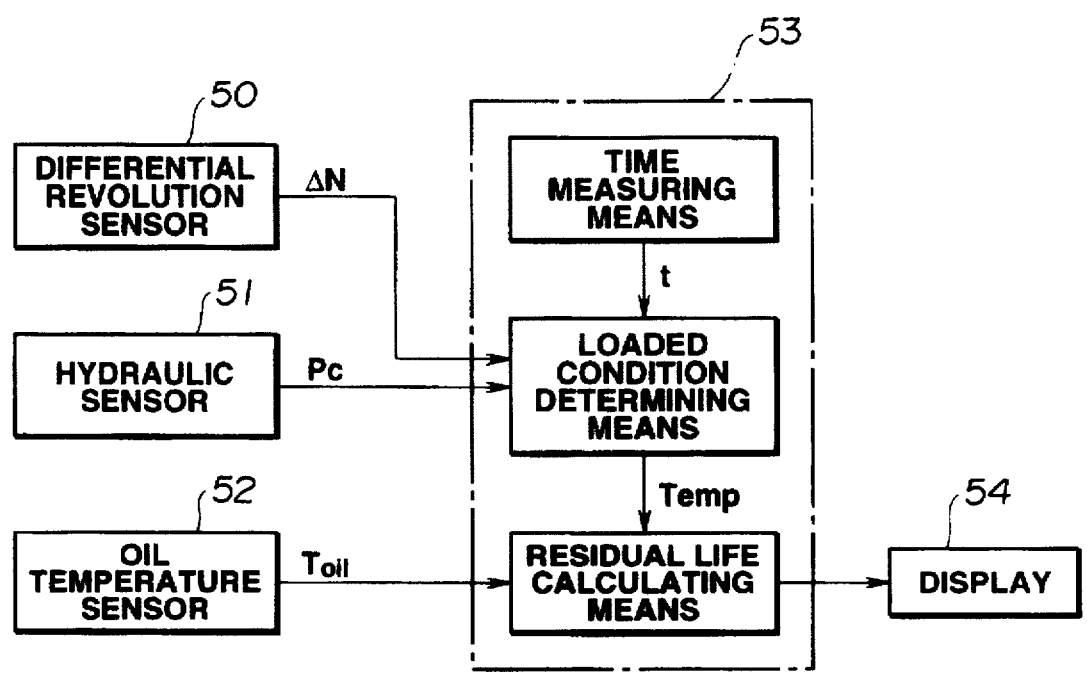
FIG. 2 is a block diagram showing a preferred embodiment of a system for determining a residual life of a multiple friction clutch.

A system for determining a residual life of the multiple friction clutch 11a is constructed as follows. Referring to FIG. 2, this system comprises a differential revolution sensor or differential revolution detecting means 50 for detecting a differential revolution of the multiple friction clutch 11a, a hydraulic sensor or control oil pressure detecting means 51 for detecting a control oil pressure which produces a control torque for the multiple friction clutch 11a, an oil temperature sensor or oil temperature detecting means 52 for detecting a temperature of working fluid of the control oil pressure, a time measuring means for measuring a loading time of the multiple friction clutch 11a or time during which the differential revolution is generated, a loaded condition determining means for determining a loaded condition of the multiple friction clutch 11a in accordance with the differential revolution, control oil pressure, oil temperature, and differential revolution generating time as detected, and a residual life calculating means for calculating a residual life of the multiple friction clutch 11a in accordance with the loaded condition thereof. The time measuring means, loaded condition determining means, and residual life calculating means are provided in a control unit 53 in the form of software.

The function of the loaded condition determining means and the residual life calculating means will be described. When the differential revolution is $\Delta N$, the control oil pressure is Pc, the oil temperature is $T_{oil}$, and the differential revolution generating time is "t", a transmitted torque Tc of the multiple friction clutch 11a is obtained by the following formula:

$$Tc = k_1 \cdot Pc + a_1 \ (k_1 \text{ and } a_1 \text{ are constants})$$

A loaded energy Ec of the multiple friction clutch 11a is obtained by the following formula:

$$Ec = k_2 \cdot Tc \cdot \Delta N (k_2 \text{ is a constant})$$

A temperature Temp of a facing of the multiple friction clutch 11a is obtained by the following formula:

$$Temp = k_3 \cdot Ec \cdot t + T_{oil} (k_3 \text{ is a constant})$$

The clutch facing temperatures Temp obtained in such a way are divided into a plurality of divisions with respect to a plurality of predetermined temperature ranges so as to measure a totalizing time for an application of the multiple friction clutch 11a in each division. Referring to FIG. 3, the residual life of the multiple friction clutch 11a is obtained from a bearing force or life chart of the facing of the multiple friction clutch 11a as previously known by using the minor side thereof.

Specifically, a minor value as a factor of the residual life is calculated from the totalizing time and an equivalent life to obtain therefrom the residual life of the multiple friction clutch 11a. Referring to FIG. 3, an example of calculation of the minor value will be described.

By way of example, the following divisions (1)–(9) are established with regard to the above divisions of the clutch facing temperatures Temp:

| (1) | Temp 7 < Temp ≦ Temp 8 |
| (2) | Temp 6 < Temp ≦ Temp 7 |
| (3) | Temp 5 < Temp ≦ Temp 6 |
| (4) | Temp 4 < Temp ≦ Temp 5 |
| (5) | Temp 3 < Temp ≦ Temp 4 |
| (6) | Temp 2 < Temp ≦ Temp 3 |
| (7) | Temp 1 < Temp ≦ Temp 2 |
| (8) | Temp 0 < Temp ≦ Temp 1 |
| (9) | Temp ≦ Temp 0 |

It is noted that a life average value or equivalent life in each division is previously established in accordance with the bearing force or life chart of the facing of the multiple friction clutch 11a. Suppose, for example, that the life average values or equivalent lives are as follows:

| Division (1) | $t_1$ |
| Division (2) | $t_2$ |
| Division (3) | $t_3$ |
| Division (4) | $t_4$ |
| Division (5) | $t_5$ |
| Division (6) | $t_6$ |
| Division (7) | $t_7$ |
| Division (8) | $t_8$ |
| Division (9) | ∞ |

Subsequently, a real application time of the multiple friction clutch 11a is totalized in each division. Suppose, for example, that the real application totalizing times are as follows:

| Division (1) | $tr_1$ |
| Division (2) | $tr_2$ |
| Division (3) | $tr_3$ |
| Division (4) | $tr_4$ |
| Division (5) | $tr_5$ |
| Division (6) | $tr_6$ |
| Division (7) | $tr_7$ |
| Division (8) | $tr_8$ |
| Division (9) | not measured |

The minor values in the divisions are as follows, each being calculated by dividing the real application totalizing time by the equivalent life:

| Division | |
|---|---|
| Division (1) | $tr_1/t_1$ |
| Division (2) | $tr_2/t_2$ |
| Division (3) | $tr_3/t_3$ |
| Division (4) | $tr_4/t_4$ |
| Division (5) | $tr_5/t_5$ |
| Division (6) | $tr_6/t_6$ |
| Division (7) | $tr_7/t_7$ |
| Division (8) | $tr_8/t_8$ |
| Division (9) | not calculated |

A total of the minor values is obtained by $$\sum_{n=1}^{8}$$

The total of the minor values obtained in such a way indicates a life which has already been consumed, where a total life of the multiple friction clutch 11a is 1. Thus, if the total of the minor values is 0.65, and a distance covered up to the present is 78,000 km, for example, a residual roadable distance, i.e., the residual life of the multiple friction clutch 11a, is as follows:

$$(78000 \div 0.65) - 78000 = 42000 (km)$$

Referring to FIG. 2, the residual roadable distance is output to a display 54 for displaying.

With the system for determining a residual life of the multiple friction clutch 11a according to the present invention, the temperature Temp of the facing of the multiple friction clutch 11a is calculated in accordance with the differential revolution $\Delta N$, the control oil pressure Pc, the oil temperature $T_{oil}$, and the differential revolution generating time "t". The clutch facing temperatures Temp obtained in such a way are divided into a plurality of divisions with respect to a plurality of predetermined temperature ranges so as to measure a totalizing time in each division. Then, the residual life of the multiple friction clutch 11a, i.e., the residual roadable distance, is obtained from the bearing force or life chart of the facing of the multiple friction clutch 11a as previously known by using the minor side thereof, which is displayed on the display 54. Therefore, for determining a life of the multiple friction clutch 11a, to be exact, a life of the facing thereof, the transfer unit does not need to be removed from the motor vehicle, and disassembled completely to inspect visually the condition of the facing of the multiple friction clutch 11a arranged therein, resulting in no troublesome work.

Moreover, since it is possible to always grasp a life of the multiple friction clutch 11a, and/or to detect beforehand occurrence of a failure of the multiple friction clutch 11a, a replacement or repair of the multiple friction clutch 11a can be ensured before occurrence of a failure thereof, resulting in improved user service.

Having described the present invention in connection with the preferred embodiment, it is noted that the present invention is not limited thereto, and various changes and modifications can be made without departing the spirit of the present invention.

What is claimed is:

1. A system for indicating a residual life of a friction clutch, comprising:

means for detecting a differential revolution of the clutch and for generating a differential revolution signal indicative thereof;

means for detecting a control pressure of a working fluid used to generate a clutch engaging force of the clutch and for generating a control pressure signal indicative thereof;

means for measuring a loading time of the clutch and for generating a loading time signal indicative thereof;

means for determining a loaded condition of the clutch when the clutch is engaged based on said differential revolution signal, said control pressure signal, and said loading time signal, and for generating a loaded condition signal indicative thereof;

means for accumulating an amount of time that a facing of the clutch is subjected to said loaded condition since the clutch has been in service; and means for calculating the residual life based on the accumulated amount of time.

2. A system as claimed in claim 1, further comprising means for indicating, to an operator, a signal relating to the calculated residual life.

3. A system as claimed in claim 2, wherein the clutch includes a clutch port, and wherein said working fluid is supplied to the clutch port so as to generate the clutch engaging force.

4. A system as claimed in claim 1, wherein said loaded condition determining means comprises:

means for calculating a transmitted torque of the clutch based on said control pressure signal, and for generating a transmitted torque signal indicative thereof;

means for calculating a loaded energy of the clutch based on said transmitted torque signal and said differential revolution signal, and for generating a loaded energy signal indicative thereof; and means for calculating a temperature of the facing of the clutch based on both said loaded energy signal and said loading time signal, and for generating a facing temperature signal indicative thereof.

5. A system as claimed in claim 4, wherein said residual life calculating means comprises:

means for partitioning a temperature range of the facing temperature of the clutch into a plurality of ranges;

means for measuring a respective time for each temperature range that the clutch is subjected to since the clutch has been in service;

means for accumulating a time total for each temperature range and for calculating a value as a factor of the residual life of the clutch based on said accumulated time total and an equivalent life of the clutch that is predetermined for said each temperature range; and means for summing the calculated values for the temperature ranges and for generating a summed value signal indicative thereof.

6. A system as claimed in claim 5, wherein said residual life calculating means further comprises:

means for calculating a residual travel distance C of the clutch in accordance with a formula:

$$C = B/(A-B),$$

where A is said summed value signal and B is a distance traveled since the clutch has been in service.

7. A method for determining a residual life of a friction clutch, the method comprising the steps of:

a) sensing a differential revolution of the clutch;

b) detecting a pressure of a working fluid used to generate a clutch engaging force of the clutch;

c) measuring a loading time during which said clutch engaging force is generated;

d) determining a loaded condition of the clutch when the clutch is engaged based on said differential revolution, said pressure of said working fluid and said loaded time;

e) accumulating an amount of time that said loaded condition is detected since the clutch has been in service; and f) calculating the residual life based on the accumulated amount of time.

8. A method as claimed in claim 7, further comprising the step of indicating, to an operator, the calculated residual life.

* * * * *